April 1, 1958  F. W. JOHNSON ET AL  2,828,635
RATIO CHANGING SHAFT COUPLING
Filed Nov. 7, 1955
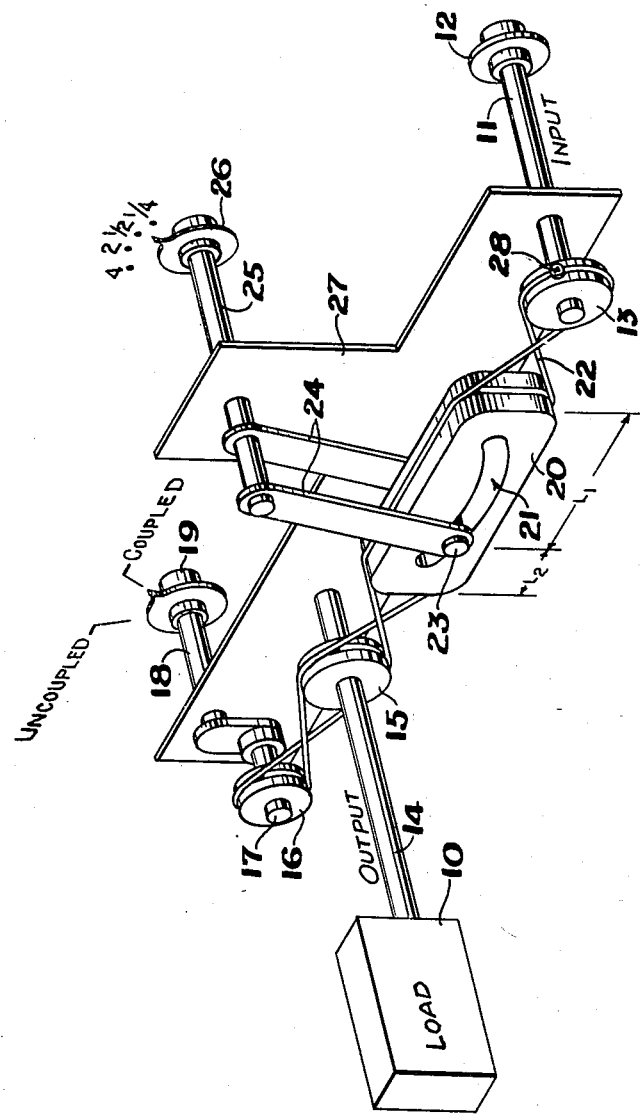
INVENTORS
FREDERICK W. JOHNSON
JOHN V. PETERS
By Moody & Hatcher
ATTORNEYS

United States Patent Office 2,828,635
Patented Apr. 1, 1958

2,828,635
RATIO CHANGING SHAFT COUPLING

Frederick W. Johnson and John V. Peters, Cedar Rapids, Iowa, assignors to Collins Radio Company, Cedar Rapids, Iowa, a corporation of Iowa Application November 7, 1955, Serial No. 545,237

5 Claims. (Cl. 74—95)

This device relates to shaft coupling devices and more particularly to a changeable ratio type wherein the ratio of the output motion relative to the input motion may be changed.

Prior art devices in the variable ratio coupling field have usually involved sets of gears with different tooth ratios or sets of pulleys with different sizes of pulleys. In each case only fixed ratios are available and interruption of the connection and of the power transmitted is necessary to effectuate the change of ratio. Except for variable radius pulleys, successful systems having other than fixed steps of ratio have been difficult to achieve. Further, some of these systems do not couple in an unbroken link from input to output shaft.

Accordingly, it is an object of this invention to provide a coupling system with a smoothly, infinitely variable coupling ratio for angular motions over a limited angular range.

It is a further object to provide a coupling in which the ratio can be varied during transmission of motion.

It is a further object to provide a coupling which can be readily clutched without disturbing the rest of the system.

A further object is to establish a system having a minimum of departure from linearity of angular velocity between input and output shafts.

One of the features of this system is the use of a pivoted block wherein the pivotal point may be altered, thereby altering the ratio of speed between the input on one side of the block and the output on the other side of the block.

Another feature of this device is that by single belt tightening means clutching may be provided in the invention in a belt driving form to permit preadjustment of relative position between input and output shafts.

Another feature of this device is that by tightening means control of backlash may be provided in chain and similar types of drive forms of the invention to permit adjustment of backlash.

Further objects, features, and advantages of the invention will become apparent from the following description and claims when read in conjunction with the drawing, in which the figure shows a perspective drawing of an embodiment of the invention.

In the figure a load 10 is coupled to an input shaft 11 for rotary motion over a limited range. A knob 12 is shown on shaft 11; this is useable for digital control in some instances, e. g., where load 10 is some part of a radio equipment requiring only a limited angular movement. Other couplings may be used on shaft 11 for other driving sources. On shaft 11 a pulley 13 is mounted. A shaft 14 extends from load 10 and carries a pulley 15. A third pulley 16 is carried on a shaft 17 which is eccentrically mounted with relation to a shaft 18. Shaft 18 carries a knob 19; knob 19 is shown here with a pointer for identification of the position of the eccentric shaft, in either "coupled" or "uncoupled" position. In the coupled position third pulley 16 puts belt 22 under tension so as to provide friction coupling between the belt and both pulley 15 and pivot block 20.

A pivot block or bar 20 is interposed between driving pulley 13 and driven pulley 15. This pivot block has an arcuate slot 21 therein; the pivot block is operable with a straight slot, however. A belt 22 is fastened to pulley 13 at point 28, runs over pulley 13, is transposed going over to block 20, runs on block 20, is transposed again as it goes over to pulley 15, runs on pulley 15, is transposed once again and goes around pulley 16. Pivot block 20 is held by the tension of belt 22 substantially as to all degrees of freedom of displacement and rotation. Rotation of the pulleys moves belt 22 longitudinally and by friction forces rotates block 20 about pivot 23.

The pivot 23 for block 20 is transverse to the plane of the belt 22 and is carried by arms 24 which are fastened to shaft 25. Knob 26 is on the control end of shaft 25, and has a pointer which may be used to indicate the ratio of the output motion to input motion. Shafts 11, 14, 18, and 25 are substantially parallel to each other in the embodiment illustrated, but may be at angles to each other if necessary with proper modification as will be obvious to one skilled in the art. These four shafts are shown carried by a base 27 and mounted therein by bearings not shown.

Pivot bar 20, for perfect motion transfer linearity, would be almost touching pulleys 13 and 15 on each end and would have a shape relative to the axis of motion of pivot 23 which would be on a radius equal to the distance between the axis of motion and the end adjacent each pulley. In the assembly illustrated, the spacing of pivot bar 20 and the pulleys 13 and 15 is grossly exaggerated for ease of illustration. In actual practice the belt would be as thin as possible, relatively, with for example, a thin steel tape to permit as close a spacing as possible between the pivot body and the pulleys. Under these conditions, the transfer of motion would be linear for the one case where the block is pivoted at the center of the circles which describe the end surfaces. As the axis of motion is moved away from this point the linearity of the transfer of motion would decrease. Also as the spacing between surfaces of each of the pulleys and the pivot bar increases, the motion transfer linearity decreases.

In a modification utilizing the invention with gearing, use of gear teeth instead of belting would make it more difficult to establish conditions for linearity. The gear teeth would be on a radius which would be satisfactory as to mesh only for one set of radii. A compromise using a shallow tooth shape would be necessary to permit a wide variation of ratios.

In operation, rotation of pulley 13 moves pivot bar 20 by means of the friction forces of belt 22 while under tension. The rotation of pivot bar 20 causes the belt passing between that body and pulley 15 to move pulley 15. This is with pulley 16, as shown, in "coupled" position.

Rotary motion of knob 19 from its illustrated position to the uncoupled position will move pulley 16 toward pulley 15 and release tension on belt 22. In the uncoupled position rotation motion of input shaft 11 will not move pulley 15.

When gearing or sprocket and chain or other toothed means are used, a motion similar to that of shaft 18 may be used for backlash control. Pulley 16 as a sprocket carrying a chain will obviously operate to adjust backlash by forcing the chain tighter onto the sprockets. By mounting shaft 14 in the place of shaft 17 this motion could be used in direct couplings such as gearing, with gear sectors on pivoted body 20, with the same result of adjustment of backlash. This latter would be possible since body 20 is supported by the coupling means at each end and restrained otherwise by shaft 33.

The position of pivot 23 in the slot of pivot bar 20 determines the speed ratio of shaft motion transmitted. With pivot 23 in the exact center of body 20, the function of pivot bar 20 would obviously be merely that of a pulley. With pivot 23 moved off the center to the left, as illustrated, it is readily apparent that a large angular motion of pulley 13 is required for a relatively smaller angular motion of pulley 15. The speed ratio between output and input motions can be expressed as $$\frac{L_2}{L_1}$$

assuming the radii of pulleys 13 and 15 to be equal. With pivot 23 moved toward the input pulley end of slot 21, a small rotation of input pulley 13 will move the pivot bar a large angular amount, to rotate pulley 15 a large amount.

It is obvious that, consistent with the description heretofore given, sprockets and chain can be used as a direct substitution for the belting losing, however, the clutching use of pulley 16. Pulley 16, as a sprocket, however, can be used to adjust tightness of the chain, for controlling backlash. A further modification utilizing the principle of the pivoted body would be the use of gears in the place of pulleys 13 and 15 and either mounting a gear by the same variable pivot point or providing gear teeth on the ends of body 20 to engage the gears replacing pulleys 13 and 15. As noted before, the gear teeth would have to be a compromise to accommodate the wide range in pitch radii in operation. It is obvious that virtually any rotation drive means such as gear, sprocket and chain, toothed belting, or other means for mechanically coupling shafts well known in the art, may be used within the scope of this disclosure.

Although this invention has been described with respect to particular embodiments thereof, it is not to be so limited because changes and modifications may be made therein which are within the full intended scope of the invention as defined by the appended claims.

We claim:

1. A variable ratio shaft coupling comprising an input shaft, an output shaft, a pivot bar having a variable position axis of pivotal motion, means coupling said input shaft to said pivot bar, and means coupling said pivot bar to said output shaft.

2. A variable ratio shaft coupling comprising an input and an output shaft carrying input and output rotational drive means, respectively, an intermediate pivoted body having a slot therein, said body supported by a pivotal means engaging said slot at a selected point, said pivot body having rotational driving means thereon operational with and coupling said output drive means to said input drive means.

3. A variable ratio belt coupling means comprising an input shaft carrying an input pulley, an output shaft carrying a driven pulley, a pivot bar having a slot therein, a belt fastened to said input pulley and running over said input pulley, said pivot bar, and said driven pulley, and pivot means transverse to said belt passing through said slot whereby the position of said pivot means determines the ratio of output rotation to input motion.

4. The belt coupling of claim 3 including an idler pulley carrying said belt also, said idler pulley being mounted so as to put said belt under an operating tension.

5. A variable ratio coupling means comprising an input shaft carrying an input pulley, an output shaft carrying a driven pulley, a pivot bar having an arcuate slot therein, said slot being positioned in the central portion of said body and transverse thereto, an idler pulley, a belt fastened to said input pulley and running over said input pulley, said pivot bar, said driven pulley, and said idler pulley, said idler pulley being mounted so as to adjust the tension of said belt, the belt being transposed between each of said pulleys and said pivot bar, and pivot means passing through said slot transverse to the plane of said belt whereby the position of said pivot means determines the ratio of output motion to input motion.

References Cited in the file of this patent

UNITED STATES PATENTS

| 436,139 | Juengst | Sept. 9, 1890 |
| 522,570 | White | July 3, 1894 |

FOREIGN PATENTS

| 752,164 | France | July 10, 1933 |